US008166342B2

(12) United States Patent
Rahman et al.

(10) Patent No.: US 8,166,342 B2
(45) Date of Patent: Apr. 24, 2012

(54) MOBILITY PDA SURVEILLANCE USING GPS

(75) Inventors: Moshiur Rahman, Marlboro, NJ (US); Paritosh Bajpay, Edison, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 23 days.

(21) Appl. No.: 12/650,048

(22) Filed: Dec. 30, 2009

(65) Prior Publication Data

US 2011/0161745 A1   Jun. 30, 2011

(51) Int. Cl.
*G06F 11/07* (2006.01)

(52) U.S. Cl. ............. 714/26; 714/25; 701/213; 455/440; 455/456.5

(58) Field of Classification Search .................... 714/25, 714/26, 32; 701/213; 455/421, 440, 456.5, 455/525
See application file for complete search history.

(56) References Cited

U.S. PATENT DOCUMENTS

| | | | | | |
|---|---|---|---|---|---|
| 5,517,674 | A | * | 5/1996 | Rune | 455/437 |
| 6,298,316 | B1 | * | 10/2001 | Diesel | 702/190 |
| 6,628,953 | B1 | * | 9/2003 | Dillon et al. | 455/452.1 |
| 6,751,443 | B2 | * | 6/2004 | Haymes et al. | 455/67.11 |
| 7,127,213 | B2 | * | 10/2006 | Haymes et al. | 455/67.11 |
| 2001/0031625 | A1 | * | 10/2001 | Lynn | 455/67.1 |
| 2002/0045456 | A1 | * | 4/2002 | Obradovich | 455/457 |
| 2003/0040868 | A1 | * | 2/2003 | Fish et al. | 701/213 |
| 2009/0047961 | A1 | * | 2/2009 | Kim | 455/436 |
| 2011/0053606 | A1 | * | 3/2011 | Yao et al. | 455/456.1 |
| 2011/0102256 | A1 | * | 5/2011 | Shen et al. | 342/357.31 |

OTHER PUBLICATIONS

Wikipedia's UMTS Terrestrial Radio Access Network version from Dec. 17, 2009 http://en.wikipedia.org/w/index.php?title=UMTS_Terrestrial_Radio_Access_Network&oldid=332217553.*
Wikipedia's Personal digital assistance version from Dec. 14, 2009 http://en.wikipedia.org/w/index.php?title=Personal_digital_assistant&oldid=331604405.*

* cited by examiner

*Primary Examiner* — Joseph Schell
(74) *Attorney, Agent, or Firm* — Woodcock Washburn LLP

(57) ABSTRACT

A method for troubleshooting a mobile device operating in a network includes receiving a request from the mobile device to a network server via a global positioning system (GPS) interface; extracting a report from the network; comparing values in the report to threshold values; requesting additional data collection based on the comparing step; analyzing the additional data; and sending a report to the mobile device. The mobile device may be a personal digital assistant. The invention includes a system configured to perform the foregoing method steps.

15 Claims, 2 Drawing Sheets

MOBILITY PDA SURVEILLANCE USING GPS

TECHNICAL FIELD

The technical field generally relates to mobile network diagnostics and more specifically to using the global positioning system (GPS) capability of the network to isolate and diagnose problems with personal digital assistant (PDA) mobile devices.

BACKGROUND

With ubiquitous cellular telephone coverage now the norm, there has been a more recent proliferation of personal digital assistant (PDA) mobile devices. If a user experiences a problem with the PDA, it may not be able to diagnose the problem, especially if the normal voice connection to customer service is not available. That may happen when the PDA has no connectivity with the radio access network (RAN) or poor connectivity with the RAN. In such a case, it may be difficult or impossible to receive fault data. As such, a user would not necessarily be able to know whether she was experiencing a network problem or a problem with the PDA. This is true, despite the fact that most PDAs have a GPS capability built in or have communication capability to a GPS unit using short range wireless communications protocols such as Bluetooth.

SUMMARY

The present invention is directed to using GPS link for mobility fault management, a novel and unique concept in mobility surveillance arena. This is done without involving the radio network controllers, which may be the source of the fault or, if normal communication with the PDA is not available, then access to the radio network controllers may be lost. The concept of the present invention is to detect and isolate PDA faults using UTRAN fault data (such as pathloss and Uplink Bit error rate (UL BER)) over existing GPS and the Service Assurance connections. The GPS system knows the exact PDA location and it will help the service assurance to isolate the fault location either within the wireless network or external to the wireless network. This feature will allow a PDA user to send a query to Net Manager Network server on demand. Service assurance (SA) will be able to monitor and notify the PDA user about the health of the PDA dynamically with this capability.

In accordance with the present invention, there is a method for troubleshooting a mobile device operating in a network. The method includes receiving a request from the mobile device to a network server via a global positioning system (GPS) interface, extracting a report from the network, comparing values in the report to threshold values, requesting additional data collection based on the comparing step; analyzing the additional data; and sending a report to the mobile device. The threshold values may be predetermined. The method is performed using internet protocol for the extracting step and the additional data is performed by elements included in the UTRAN. The reports include fault reports which may include, but are not limited to uplink bit error rate faults and pathloss data. The analyzing step determines whether the fault lies within the network or the mobile device. In one embodiment of the invention, the sending step is performed using the GPS interface. According to another embodiment of the invention, the requesting step is performed only if the values in the report exceed the threshold values. The mobile device may be a personal digital assistant (PDA).

The invention is also directed to a system for troubleshooting a mobile device. The system includes a global positioning system (GPS) in communication with the mobile device; a wireless network comprising a base station, a mobile switch and a data gateway; and a network server in communication with the GPS and the base station. The network server is configured to receive a request from the mobile device via the GPS interface extract a report from the network, compare values in the report to threshold values; requesting additional data collection based on the comparing step; analyzing the additional data; and sending a report to the mobile device through the GPS network. The wireless network may include a UMTS Terrestrial Radio Access Network (UTRAN). The mobile device may be a PDA and the PDA may have the GPS integral to the mobile device.

BRIEF DESCRIPTION OF THE DRAWINGS

The following description is better understood when read in conjunction with the appended drawings.

DESCRIPTION OF ILLUSTRATIVE EMBODIMENTS

There are certain data relating to performance measurement which are collected and available in the radio access network (RAN) of a wireless communications network. The exemplary embodiments of the present invention will be directed to using RAN measurement data and other data residing within existing UMTS Terrestrial Radio Access Network (UTRAN) equipment using a global positioning system (GPS) link.

Figure 1:
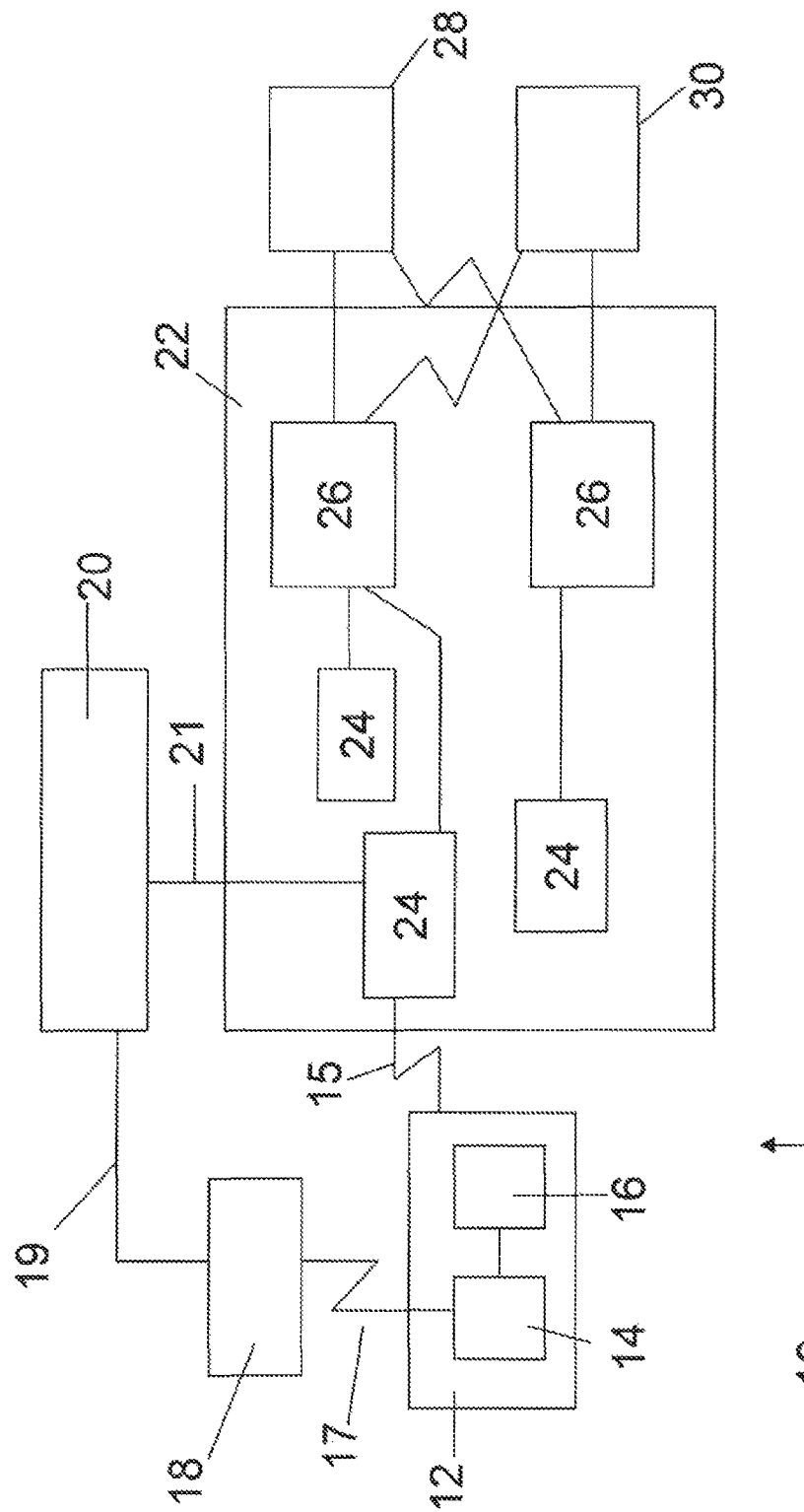
FIG. 1 is an exemplary system that is configured for receiving a request using the GPS system in accordance with the present invention.

With reference to FIG. 1, there is shown the system 10 which may be constructed in an exemplary embodiment of the present invention. The present invention will be described as implemented in a 3G network in an exemplary embodiment, but the invention is not necessarily limited to implementation only on a 3G network and may also include 4G, CDMA, WDCMA, and any other types of wireless communications networks. The system 10 includes a mobile handset 12 which includes user equipment (UE) 16 and a GPS function 14. It will be understood by those skilled in the art that the UE 16 and the GPS 14 may be integrally constructed into a single mobile handset 12 or that the UE 16 and the GPS 14 may be separate with the GPS 14 being external to the mobile handset 12. The GPS 14 is in data communication with the GPS server 18 across airlink 17, which GPS server 18 in turn is in data communication with network server 20 across IP interface 19. Network server 20 is preferably located within the wireless service provider's network (not shown) but may be external to the wireless service provider's network but connected therethrough. The network server 20 may provide a variety of functionality, but in particular and in accordance with an embodiment of the present invention, may include a service assurance function.

The network server 20 interfaces with a UMTS Terrestrial Radio Access Network (UTRAN) system 22 through an IP interface 21. IP interface 21 connects to one or more base stations, or Node Bs 24, forming part of the UTRAN system 22. The Node B 24 is in wireless communication with the mobile handset 12 over air interface 15. Node B 24 is also in data communication with one or more Radio Network Controller (RNC) 26 internal to the UTRAN and the RNC 26 is in data communication with Mobile Switching Center (MSC) 28 external to the UTRAN and the SSGN 30 external to the UTRAN in accordance with the exemplary embodiment set forth in FIG. 1.

As will be understood by those skilled in the art, under normal operations, the mobile handset 12 may be a personal digital assistant, or PDA. The mobile handset 12 communicates wirelessly with the UTRAN 22 through interface 15. The mobile handset 12 also communicates wirelessly with the GPS server 18 to provide the network access to the location of the mobile handset 12. It will be noted by those skilled in the art that the mobile handset 12 that includes GPS capability communicates with a GPS satellite to obtain location information. If there is a problem with the performance of the mobile handset 12 operating on the wireless network, the mobile device has access to the UTRAN through wireless interface 15 for diagnostic purposes and for reaching a customer service operator. According to an embodiment of the present invention, a second diagnostic path for the mobile handset 12 to the UTRAN 22 is provided through the GPS server 18 and the network server 20.

Figure 2:
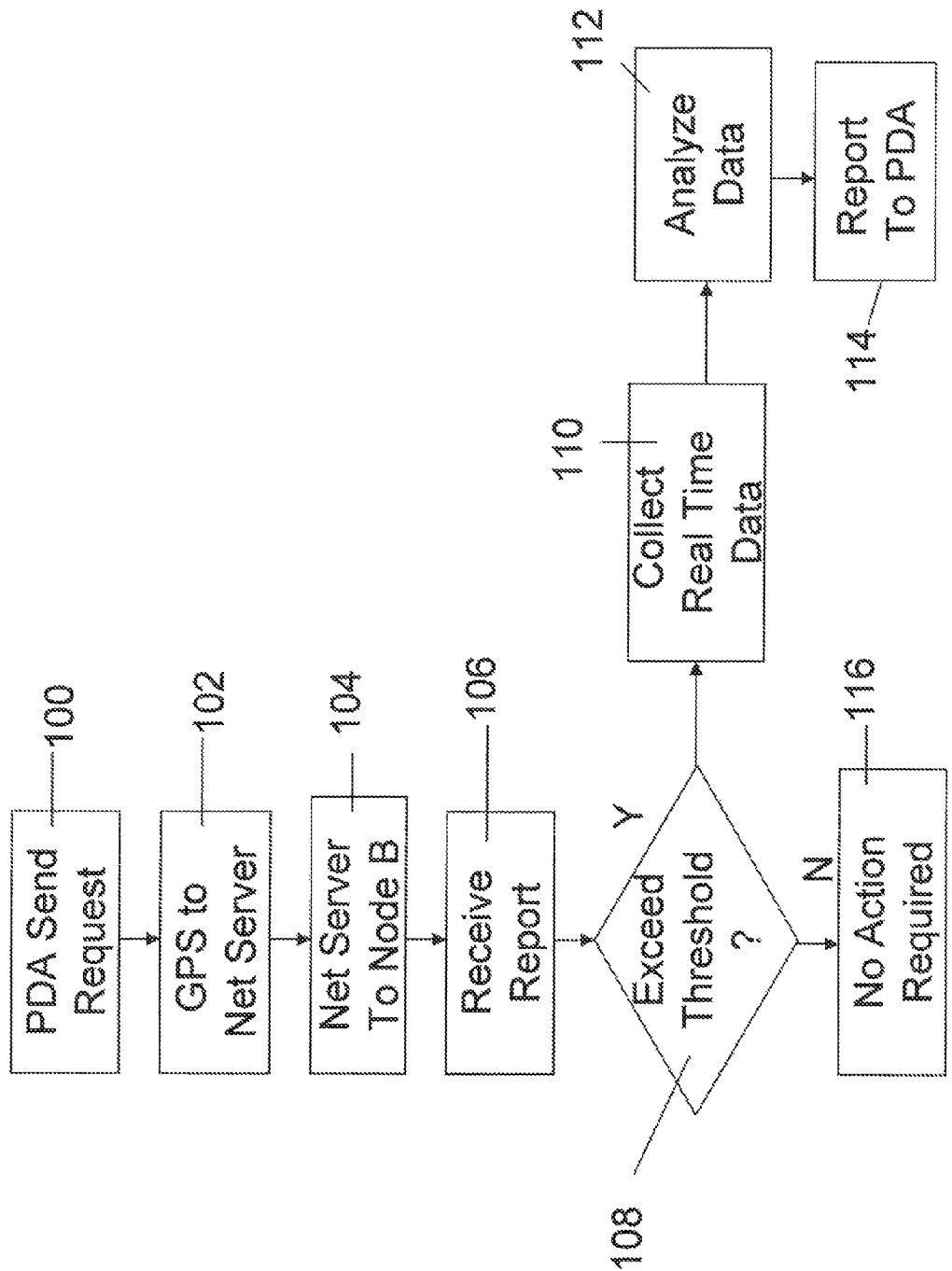
FIG. 2 is a flow chart illustrating the steps of an exemplary method in accordance with the present invention.

An exemplary process flow for the using the GPS server 18 and network server 20 for diagnostic purposes is set forth in FIG. 2 which will be described in conjunction with the network architecture of FIG. 1 wherein the mobile handset 12 is a PDA with a GPS connection 14. In this solution both PDA and the GPS receiver preferably communicate using a short distance Wi-Fi, such as Bluetooth. As shown in the diagram, at step 100, a mobile handset 12 sends a request which may, for example be a Query Net Manager (QNM) message. At step 102, network server 20 will receive a request from the mobile handset 12 based on the IP address by way of the GPS link 17 and GPS server 18 and the IP link 19 without going through the UTRAN 22. The request will initially be analyzed by the network server 20 using internal logic to analyze the problem, isolate the problem and notify the user about the results of the troubleshooting. At step 104, the network server 20 sends a message to Node B 24 requesting previous RTT measurement reports which had been previously collected. That data may, for example, include Pathloss and uplink Bit error rates (UP BER) data. At step 106, the network server 20 receives the report from the Node B 24. The network server 20 will analyze the received report to determine if the value of the measurements, for example Pathloss or UP BER, exceed a certain pre-defined threshold at step 108. If not, there is no further diagnostic action taken by the network server 20 at step 116 and a message will be sent to the mobile handset 12 confirming same. If the measurements exceed a threshold, a request for the UTRAN to collect more real time data is made at step 110. This may be done by the network server communicating with the Node B 24 to the mobile handset 12. At step 112, the network server analyzes the collected data. At step 114, the network server 20 reports the results of the troubleshooting back to the mobile handset 12 using the GPS path. Based on that analysis, if it is determined that there is an application problem on the mobile handset, it is possible that the Network Server can take some action remotely to fix the problem or otherwise notify the PDA user about the problem. If it is determined to be a network problem, the network server 20 is then able to notify the network service team about the problem.

As will be appreciated by those skilled in the art, the present invention will allow the PDA user to diagnose and resolved a range of possible problems which may occur either in the PDA or the network. It is able to do so using an existing GPS link in a novel way. As such, the method and system of the present invention will assist in identifying the cause of the problem and providing the solution remotely while doing so quickly and efficiently. Additionally, by early detection and resolution, it may be possible to avoid major outages in the network and the resultant revenue loss.

While the present invention has been described in connection with the various embodiments of the various figures, it is to be understood that other similar embodiments can be used or modifications and additions can be made to the described embodiment for performing the same function without deviating therefrom. For example, one skilled in the art will recognize that the definitions and scopes of mobile alerts as described in the present application may apply to any environment, whether wired or wireless, and may be applied to any number of such devices connected via a communications network and interacting across the network. Therefore, the method and system of defining mobile alerts should not be limited to any single embodiment, but rather should be construed in breadth and scope in accordance with the appended claims.

The invention claimed is:

1. A method comprising:
    receiving a request from a mobile device to a network server via a global positioning system (GPS) interface device;
    extracting a report from the network;
    comparing values in the report to threshold values;
    requesting additional data collection based on the comparing;
    analyzing the additional data; and
    sending, through the GPS interface device, the report to the mobile device.

2. The method of claim 1 wherein the extracting step is performed over an internet protocol interface.

3. The method of claim 1 wherein the additional data is collected by a UTRAN system.

4. The method of claim 1 wherein the report to the mobile device includes fault reports.

5. The method of claim 4 wherein the fault reports comprise uplink bit error rate faults.

6. The method of claim 4 wherein the fault reports comprise pathloss data.

7. The method of claim 4 wherein the threshold values are predetermined.

8. The method of claim 1 wherein the sending step is performed using the GPS interface device.

9. The method of claim 1 wherein the requesting step is performed only if the values in the report exceed the threshold values.

10. The method of claim 1 wherein the analyzing determines whether a fault lies within the network or the mobile device.

11. The method of claim 1 wherein the mobile device is a personal digital assistant.

12. A system comprising:
    a global positioning system (GPS) in communication with a mobile device;
    a wireless network comprising:
        a base station;
        a mobile switch; and
        a data gateway; and
    a network server in communication with the GPS and the base station, the network server configured to:
        receive a request from the mobile device via a GPS interface device;
        extract a report from the network;
        compare values in the report to threshold values;

request additional data collection based on the comparing;
analyze the additional data; and
send a report to the mobile device through the GPS interface device.

13. The system of claim 12 wherein the wireless network includes a UMTS Terrestrial Radio Access Network (UTRAN).

14. The system of claim 12 wherein the mobile device is a PDA.

15. The system of claim 12 wherein the GPS is integral to the mobile device.

* * * * *